United States Patent
Adams et al.

[11] Patent Number: 5,876,040
[45] Date of Patent: *Mar. 2, 1999

[54] REUSABLE ONE PIECE LOW PRESSURE SEAL

[76] Inventors: Danny L. Adams, 3458 Irving Ave. N., Minneapolis, Minn. 55412-2514; Ira I. Miles, 10923 W. Calle Del Sol, Phoenix, Ariz. 85037

[*] Notice: This patent issued on a continued prosecution application filed under 37 CFR 1.53(d), and is subject to the twenty year patent term provisions of 35 U.S.C. 154(a)(2).

[21] Appl. No.: 730,104

[22] Filed: Oct. 15, 1996

[51] Int. Cl.[6] .................................................... F16J 15/00
[52] U.S. Cl. ........................ 277/626; 277/496; 277/631; 285/104
[58] Field of Search ..................................... 277/110, 117, 277/119, 121, 497, 496, 498, 499, 546, 609, 631, 626; 285/104

[56] References Cited

U.S. PATENT DOCUMENTS

| | | | |
|---|---|---|---|
| 831,139 | 9/1906 | Bonner | 277/110 |
| 853,003 | 5/1907 | Collins | 277/216 |
| 1,182,359 | 5/1916 | Dies | 277/110 |
| 2,721,749 | 10/1955 | Crow | 277/110 |
| 2,831,714 | 4/1958 | Thorburn | 277/117 |
| 3,036,601 | 5/1962 | Fabian, Jr. et al. | 277/117 |
| 4,580,788 | 4/1986 | Rabe et al. | 277/110 |
| 4,728,479 | 3/1988 | Merkovsky | 376/203 |
| 5,083,749 | 1/1992 | Linderman et al. | 277/110 |

*Primary Examiner*—Daniel G. DePumpo
*Attorney, Agent, or Firm*—Janet Peyton Schafer

[57] ABSTRACT

The low pressure seal arrangement for sealing a space defined by an inner diameter of a pipe and a rod slidably disposed with the pipe. The low pressure seal includes a sealing insert of reusable, noncorrosive, shape retentive, resilient, boron-resistant, flexible polymeric resin with an axial passage for receiving the tubular rod. The sealing insert combines the functions of a gasket and a stopper, the sealing insert having a hub end of a larger diameter than the pipe, preventing the sealing insert from slipping into the pipe. The sealing insert is installed by hand without tools and resists a pressure of at least 350 psi. The sealing insert may be removed and reused, reducing the amount of radioactive waste generated by the nuclear reactor.

17 Claims, 2 Drawing Sheets

REUSABLE ONE PIECE LOW PRESSURE SEAL

BACKGROUND

The present invention relates generally to the field of fluid seals and more particularly to pressure seal fittings such as low pressure seal fittings used in connection with a nuclear reactor where a low pressure seal is used between the sealing thimble guide tube and thimble tube at the seal table of such a nuclear reactor during refueling and/or repair of the nuclear reactor.

The current invention relates to an alternative sealing device for a low pressure seal which interchanges with a releasably disassembled high pressure compression fitting. The invention has particular usefulness with the refueling of a pressurized water reactor in the commercial nuclear industry.

A pressurized water reactor refueling process occurs in cycles predicated on the reactor load requirements. The refueling process is a routine operation which is normally performed annually. Each refueling cycle requires a series of operations to be performed in preparation for reloading the reactor core. For the sake of economy, it is desirable that the refueling operation be accomplished as quickly as possible. The present invention is generally directed toward simplifying the refueling operations, reducing "downtime" of the nuclear reactor, increasing the reliability of certain components and reducing radioactive waste.

In a typical pressurized water nuclear reactor, the reactor vessel is seated in a concrete well and contains the nuclear reactor core. Pressure fitting arrangements are assembled on an exterior of the reactor well in an area referred to as the seal table. This arrangement permits reactor monitoring instrumentation, known as neutron flux detectors, to access the reactor core through a combination of stainless steel tubes, referred to as thimble guide tubes and thimble tubes.

The thimble guide tube is welded at a first end to the bottom of the reactor vessel where it penetrates the reactor vessel interior. A second end of the thimble guide tube extends through the reactor biological chamber to the seal table, which is a stainless steel plate whose primary function is to provide a seismic support. The second end of the thimble guide tube is welded to the seal table. The thimble guide tube penetrates just beyond the seal table, terminating as a stub. The interior of the thimble guide tube is exposed to the reactor coolant water and provides a primary pressure boundary for the reactor. The thimble guide tube acts as a guide for the thimble tube.

The thimble tube is a relatively smaller hollow stainless steel tube which is housed within the protective boundary of the thimble guide tube. The first end of the thimble tube, which is a closed end or "bullet nose", extends to the top of the reactor core, while a second end, which is open, passes through the guide tube stub to provide an axial passage as a guide path for the neutron flux detector which may travel the entire length of the thimble tube into the reactor core. This is done for monitoring the reactor during operation. The interior of the thimble tube is essentially dry and is maintained at atmospheric pressure. The flux detector is manipulated through the thimble tube to a point abutting the "bullet nose" during the monitoring process. During normal reactor operation, the thimble tubes extend from the upper plate of the core downwardly to the bottom of the vessel where they pass through a penetration in the bottom of the vessel and end at the seal table, outside the vessel well. Normally, the thimble tube is empty. However, during monitoring, a neutron flux detector is pushed through the thimble tube to the top of the core and then retracted. The thimble tube travels through a thimble guide tube into the reactor core.

The thimble guide tube has an interior diameter larger than the exterior diameter of the thimble tube resulting in an annulus, or space, between the two. This necessitates the use of a high pressure fitting to create a barrier to seal the annulus as the thimble tube extends through the thimble guide tube stub opening precluding escape of reactor coolant during reactor operation.

During the refueling process, a high pressure fitting is disassembled to allow the thimble tubes to be retracted a predetermined distance from the reactor core. This is done to facilitate handling of the reactor fuel assemblies for loading and or unloading of the reactor fuel into the reactor core. The reactor is deactivated for the entire refueling process. The water level in the biological chamber is maintained below a reactor vessel flange, which is slightly lower than the high pressure fitting at the seal table, while the thimble tube is being adjusted.

After thimble tubes are retracted from the reactor core and a high pressure seal is disassembled, a pressure seal is temporarily installed to temporarily replace the high pressure seal. The disconnected portion of the high pressure fitting remains attached to the thimble guide tube. A low pressure seal is required for sealing the thimble guide tube vent path to preclude the reactor cavity water from escaping during fuel handling. The reactor cavity is flooded a predetermined depth above the reactor core which enables fuel assemblies to be altered or replaced within the reactor core. It is imperative for the reactor cavity water level to maintain a minimum height of 10 feet above the fuel at all times to effect radiological control in the plant and public at large.

Before the reactor core can be accessed, the reactor head is lifted off the vessel flange and the reactor cavity is flooded approximately 24 feet above the reactor vessel flange. A low pressure seal is installed at the seal table, between the guide tube stub and the thimble tube, to restrain the reactor cavity water prior to reactor head removal.

Safety concerns associated with the low pressure seal are directed toward the seal's ability to provide a fluid seal against the reactor cavity static head water pressure of approximately 14 pounds per square inch (psi) at the seal table during the reactor refueling operation. A recent requirement imposed upon the low pressure seal is that it must maintain a fluid seal during inadvertent transient loads which can occur during reactor maintenance activities while the low pressure seal is installed should inadequate vent paths exist during reactor disassembly and reassembly. These loads can theoretically reach as high as 350 pounds per square inch (psi). This is a requirement that surpasses the low pressure seals taught by the prior art.

Techniques used to form a low pressure seal in the past have several shortcomings. A first shortcoming is that they are time consuming to manipulate because they require multiple steps to complete installation. An example is U.S. Pat. No. 4,728,479, Merkovsky, which teaches a low pressure seal that must fittingly mate with a high pressure seal nut, which is a compression type seal, that employs a compression ring or a ferrule already installed on a guide tube, and is compressed about the guide tube stub to form a fluid seal when mating the male and female compression fitting bodies together. The ferrule also serves as an anchor for the high pressure seal nut to permit the low pressure seal fitting to compress against the low pressure sealing device.

A second shortcoming is that they are unreliable in their ability to maintain a fluid seal of the annulus formed by the guide tube stub inner diameter and the slidable thimble tube outer diameter. Current low pressure seals only expand across the top of the guide stub to the thimble tube, relying on a downward load to compress the seal snugly over the annulus between the guide tube and the thimble tube leaving a small margin for error in installation and in thimble handling. In most instances, this kind of seal is vulnerable to the slightest movement against the thimble tube which causes a breach in the seal. Third, the prior art does not satisfy "shut down risk analysis" pressure ratings now in effect which can range as high as 350 pounds per square inch (psi). And a fourth shortcoming in the prior art is that the low pressure seals have a short life. They must be replaced after each use which adds to the amount of radioactive contaminated waste the nuclear plant facilities must discard.

Over the period of ever-changing modifications, intended to enhance the performance of refueling operations, more attention has been focused on the low pressure seal. The present invention is directed to simplify the refuelling process by providing a manually manipulated low pressure seal while satisfying the safety concerns and reducing radioactive waste by utilizing a reusable seal.

SUMMARY

The present invention is directed to a low pressure seal arrangement that satisfies these needs for a low pressure seal that is simple to install and use and that meets safety requirements and reduces radioactive waste. A low pressure seal having features of the present invention comprises a low pressure seal arrangement for sealing an annulus, a space defined by an inner diameter of a pipe and rod slidably disposed within the pipe and extending beyond an end of the pipe, comprising a one piece, conical shaped insert that may be manually installed and easily disinstalled and is reusable.

The function of a low pressure seal is to provide a temporary barrier between the thimble guide tube inner diameter and the outer diameter of a thimble tube extending from the guide tube stub after the high pressure seal has been disassembled. It is the intent of this new invention to simplify the process of installing a low pressure seal while providing a more effective and reliable barrier which is user friendly and reduces the opportunity for human error while satisfying the "shut down risk analysis" criteria.

Prior art compression fittings are used to secure the low pressure seal between the thimble guide tube axial passage and the thimble tube. The hub or head of the present invention provides a sufficient load bearing surface which allows the seal to be uniformly compressed into the guide tube stub annulus without requiring additional load bearing devices, such as special washers, to assist compression of the seal as do the prior art sealing devices. The present invention therefore reduces the number of elements needed to make up the seal.

The low pressure seal of the present invention teaches use of a conical shaped low pressure seal body which, when used with existing compression socket which forces the low pressure seal body downwardly, additionally creates a side load on the seal. The upper diameter neck of the conical shaped seal body is compressed against the top of the thimble guide tube stub interior diameter and the conical shaped seal is partially disposed into the guide tube annulus while the inner diameter of the seal aperture is firmly compressed circumferentially around the outer diameter of thimble tube the entire length of the seal aperture.

The addition of a side load, created by the conical shaped seal being partially disposed into the guide tube annulus, increases the force of the seal attachment. This creates a "hand-in-glove" type of fit which allows the thimble tube to be moved while the reactor cavity is flooded without breaching the low pressure seal. This is an improvement over the known art.

The seal of the present invention has a longitudinal split cut at an angle extending from the seal aperture to the seal outer diameter. This allows the present invention to be installed manually without special tools. The seal fits around the outer diameter of the thimble tube. The seal is made of a polymeric, resilient material that may be deformed upon installation but returns to its original conical shape for reuse without compromising its sealing capabilities. Having the split formed at an angle impedes the reactor coolant from penetrating the seal when the split is compressed within the annular space.

BRIEF DESCRIPTION OF THE DRAWINGS

Understanding of the invention will be enhanced by referring to the accompanying drawings, in which like numbers refer to like parts in the several views and in which.

DETAILED DESCRIPTION

Understanding of the invention will be further enhanced by referring to the following illustrative but nonlimiting example.

The one piece low pressure seal of the present invention includes an insert having an axial passage therethrough for receiving a thimble tube, the insert combining the functions of a gasket and a stopper, and having a hub that prevents the insert from slipping into the guide tube stub. The insert is installed by hand and is reusable which reduces radioactive waste generated by the nuclear reactor. Additionally, installation of the low pressure seal of the present invention, which seals the guide tube annulus, the space between thimble tube and guide tube stub, reduces the potential for a fluid seal breach, and thus permits the thimble tube to be retracted while the reactor cavity is fully flooded during refueling or other reactor cavity related activities. This reduces the time needed for routine refueling operations because the reactor cavity does not have to be drained below the low pressure seal in preparation for lifting the reactor internals for inspection or removal. This reduction in time translates to a reduction in costs associated with the refueling process. Additionally, because the low pressure seal is applied by hand to a snug tight fit, the cost of tools is saved and the time needed for installation of the low pressure seal is reduced which also represents an economic saving.

Figure 1:
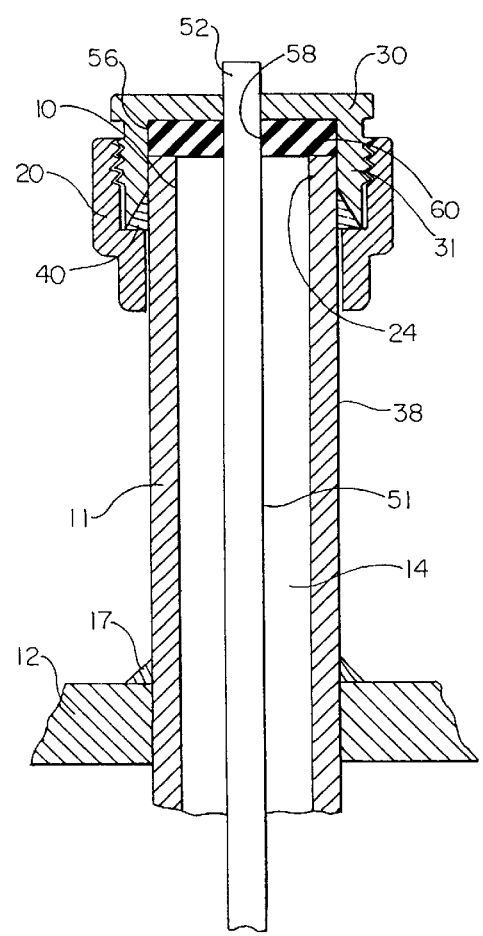
FIG. 1 illustrates an axial sectional view of a low pressure seal at the seal table between a thimble guide tube stub and thimble tube in accordance with the prior art.

Turning now to the drawings, in which like reference characters refer to corresponding elements throughout the several views, FIG. 1 illustrates the prior art assembly of a low pressure seal formed at a seal table 12 between guide tube stub 11 and thimble tube 52. Guide tube stub 11 is fixed in place on seal table 12 by means of a series of welds 17. The low pressure seal is formed by placing a split rubber ring 60 around thimble tube 52 so as to overlap the end of guide tube stub 11. Split rubber ring 60 has an central aperture that corresponds in size to an outer diameter of thimble tube 52 whereas the outer diameter of the split rubber ring 60 corresponds to outer diameter of guide tube stub 11. A compression cap screw 30, which has an axial slot (not shown) with a threaded projection 31 matingly fitted to the guide tube stub compression nut 20, and is pressed firmly against the guide tube ferrule 40. Ferrule 40 has a compression tight fit about the guide tube stub 11 as a result of its initial compression in the high pressure seal (not shown) which seats ferrule 40 in a conventional manner on guide tube stub 11. Ferrule 40 provides an anchoring point for compression nut 20 to pull the compression cap 30 down onto the split rubber ring 60 which results in the rubber ring 60 compressing against guide tube stub end 11 and against outer diameter 51 of thimble tube 52 forming a fluid seal of guide tube annulus 14, the space between an inner diameter 10 of guide tube stub and outer diameter 51 of the centrally held thimble tube 52. The split rubber ring 60 is normally used in conjunction with a split metal washer, not shown, to reinforce the split rubber ring 60 sealing capability.

Figure 2:
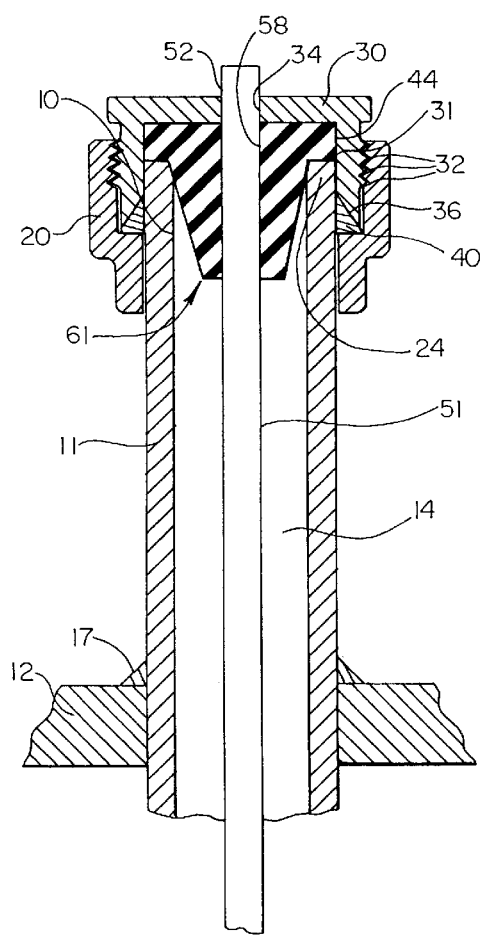
FIG. 2 illustrates an axial sectional view of the low pressure seal of the present invention, installed at the seal table between a thimble guide tube stub and thimble tube.

FIG. 2 illustrates the device of the present invention in its position of use, with the components corresponding to those in FIG. 1 given like reference numerals. The low pressure seal, as shown in FIG. 2, has a conical shaped sealing insert 61 through which extends thimble tube 52. Sealing insert 61, which has an axial passage therethrough formed by aperture 62, shown in FIG. 3B, fits atop the guide tube stub 11 and is held in place by the conventional combination of slotted compression cap screw 30 received by compression nut 20. Compression cap screw 30 holds sealing insert 61 in position on guide tube stub 11 and engages threads 32 of threaded projection 31 compressing a conventional ferrule 40 between guide tube stub 11 and compression surface of threaded projection 31 thus forming the low pressure seal of FIG. 2. The outer diameter 51 of thimble tube 52 coincides with the central aperture 62 of sealing insert 61. Sealing insert 61, of a polymeric, resilient material such as a fluoro elastomer, is deformed on installation to fit guide tube stub inner diameter 10. Neutron flux detector, not shown, passes through thimble tube 52. Metal welds 17 position stainless steel guide tube stub 11 on seal table 12, also of stainless steel. Thimble tube 52, also of stainless steel, is positioned and held centrally within guide tube stub 11 by stainless steel compression cap screw 30. Slotted compression cap screw 30 has a central aperture formed therein of a size for receiving thimble tube 52. Compression cap screw 30 is held in position atop guide tube stub 11 by means of threaded projection 31 that threadedly mates with compression nut 20, all of stainless steel.

Figure 3A:
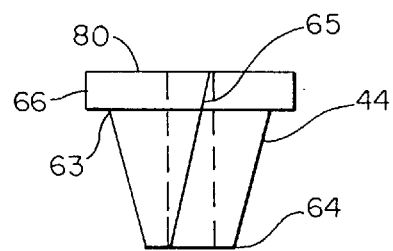
FIG. 3A illustrates an axial sectional view of the low pressure seal of the present invention.

Referring to FIG. 3A, the one piece sealing insert 61 is shown having a hub 66 at a first end, and from which extends a neck 63 portion which tapers to a bottom diameter 64 at a second end forming a conical shape attached to hub 66. Shown in phantom is aperture 62 that receives thimble tube 52, as shown in FIG. 2.

Sealing insert 61 is of a noncorrosive, resilient, polymeric material that does not degrade in a boron-rich coolant environment yet maintains flexibility for frictional engagement with both thimble tube 52 and guide tube stub 11, both rigid stainless steel components of seal table 12. In actual use conditions, sealing insert 61 is of a fluoro elastomer, such as Fluorel™, made by Dyneon Corporation, St. Paul, Minn., a subsidiary of Minnesota Mining and Manufacturing, although other noncorrosive, resilient, boron-resistant materials with a durometer strength of 70–90 durometers could be used.

Hub 66, is of a diameter large enough to provide a load-bearing surface for pushing sealing insert 61 downwardly by hand against guide tube stub 11 in a uniform manner as compression cap screw 30 is fastened snug tight in cooperation with compression nut 20. Neck 63 of sealing insert 61, shown in FIG. 3A, is tapered to fit snugly in the guide tube annulus 14 between guide tube stub 11 and thimble tube 52 protruding through sealing insert 61, FIG. 2. The upper diameter of neck 63 is slightly larger than the guide tube stub inner diameter 10 to cause an interference fit. The bottom neck diameter 64 is slightly smaller than guide tube stub inner diameter 10 to facilitate insertion of sealing insert 61 into guide tube annulus 14. A split 65 is pre-cut into sealing insert 61 longitudinally on an angle, shown at FIG. 3A, to facilitate installation surrounding thimble tube 52 and to enhance sealing capabilities. In actual use conditions, it has been found that an angle greater than 20° but less than 60° works best but other angles could be used. Additionally, the angle or slope of split 65 varies with the size of sealing insert 61 which come in a variety of sizes measured by both external diameter of hub 66, and diameter of lower neck 64 and aperture 62. Split 65 penetrates through sealing insert 61 from an outside edge to internal aperture 62. The split is oriented longitudinally on the axial passage and oriented at an angle from the axial passage on the outer surface. Having a split 65 in sealing insert 61 enables a user to place sealing insert 61 around thimble tube 52 by hand to sealingly enclose thimble tube 52, and to lock sealing insert 61 into place, with the cooperation of compression cap screw 30 and guide tube stub compression nut 20, attached by hand, as described above, forming the low pressure seal of FIG. 2. Once sealing insert 61 is in position against guide tube stub 11, split 65 is compressed completing the low pressure seal of FIG. 2. The conical shape of sealing insert 61 provides more contact surface against inner diameter 10 of guide tube stub 11 and thimble tube 52 than did the previous seals, increasing the effectiveness of the low pressure seal of FIG. 2.

Figure 3B:
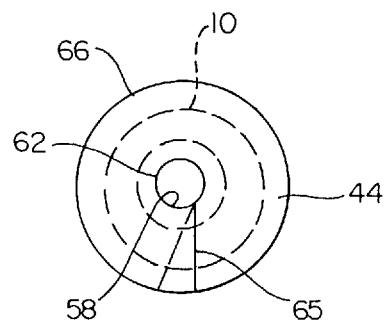
FIG. 3B illustrates a top plan view of the low pressure seal of the present invention.

FIG. 3B is a top plan view of sealing insert 61, with aperture 62 shown centrally located with split 65 shown in phantom as it is cut at an angle through sealing insert 61 to a bottom surface thereof.

An advantage of the present invention is the reusability of sealing insert 61 for forming a low pressure seal multiple times, thereby reducing radioactive waste. Also, the conical shape of sealing insert 61 provides additional compression pressure, both downwardly and to the side loads, acting against both the guide tube stub 11 and the thimble tube 52 simultaneously, enhancing the effectiveness of the low pressure seal of FIG. 2 in forming a fluid seal of the guide tube annulus 14, between guide tube stub 11 and slidable thimble tube 52. Sealing insert 61, because of its shape, seats more securely to guide tube stub 11 and because sealing insert 61 has a slit 65, it wraps snugly about thimble tube 52 effectively sealing guide tube annulus 14. This permits thimble tube 52 to be retracted or otherwise adjusted, with the low pressure seal of FIG. 2 installed alleviating the potential for a fluid seal breach, while the reactor cavity is fully flooded. This reduces the cost of routine refueling operations because the reactor cavity does not have to be drained below the elevation of the low pressure seal in preparation for lifting the reactor internals for inspection or removal, reducing the time needed for this operation.

The low pressure seal of the present invention is capable of resisting higher pressures satisfying "shut down risk analysis" safety concerns. Normally the seal is subjected to static head pressures of 14 psi resulting from a fully flooded reactor cavity. The present seal is rated for 400 psi, as tested by independent laboratory, which is above the maximum pressure theoretically possible when a reactor is "shut down" for maintenance operations.

An additional advantage of the present invention is that it has a one-piece construction which may be installed by hand without special tooling or any modification of conventional low pressure seal compression fitting. Use of the present invention reduces personnel manrem radiation exposure because it is easily installed, and shortens the length of time required to refuel a reactor or otherwise access the reactor cavity.

The sealing insert 61 provides, on an upper surface of the hub 66, sufficient surface for compressing the sealing insert 61 by hand securely within the guide tube annulus 14. This eliminates the need for additional compression devices, i.e. washers, or a rubber seal ring. Because the insert 61 has an angled split 65 formed from an outside edge through the body of sealing insert 61 to the aperture 62 defining the axial passage, the sealing insert body 61, may be easily installed about the thimble tube 52 in an area immediately above the guide tube stub 11 without removal of any permanent embodiments previously installed on the thimble tube 52, such as the high pressure fitting, not shown. The angle of the split 65, shown at FIG. 3A extends at an angle from the top edge of hub 66 to a bottom edge of insert neck 64 and at FIG. 3B, split 65 shown at a top edge of hub 66 and in phantom at the bottom edge of insert neck 64, serves to impede the escape of the reactor coolant because the angle of the split 65 does not provide a direct vertical path for fluid escape because the two faces of the split 65 butt together as a result of the manner of installation of sealing insert 61. While it is recommended that the split be oriented 180 degrees opposite a slot in a conventional compression cap, this alignment is not required for securing the fluid seal. The low pressure seal of the present invention is easy to use and install without risk of radioactive fluid leaks due to improper installation. This makes the sealing insert 61 more user friendly for technicians. Also, its use reduces the amount of time it takes to assemble a low pressure seal. To install and use the low pressure seal of the present invention illustrated at FIG. 2, the following steps are performed. The reactor cavity water level is lowered to an elevational level below that of the pressure seal at the seal table. The high pressure seal is disassembled. The thimble tube 52 is retracted to its normal refueling position. The sealing insert 61 of the present invention, shown at FIG. 2, is installed by hand by placing sealing insert 61 about thimble tube 52 and press fitting sealing insert 61 into guide tube 11, sealing guide tube annulus 14. A slotted compression cap screw 30 is placed over sealing insert 61. The slotted compression cap screw 30 is secured by hand to a snug tight fit to high pressure compression nut 20 mounted on the guide tube stub 11. This further secures the temporary connection. The reactor cavity is re-flooded to a proper depth for permitting refueling activities or inspecting the reactor core.

De-installation occurs as follows: The reactor cavity is drained to an depth below the low pressure seal elevation. The slotted compression cap 30 from the high pressure seal compression nut 20 is detached. The sealing insert 61 of the present invention is removed by hand. The thimble tube 52 is reinserted into the reactor cavity. The high pressure seal is reassembled.

The sealing insert 61 of the present invention may be retained and reused multiple times without compromising its physical or chemical properties highlighted herein.

Although the present invention has been described in considerable detail with reference to certain preferred versions thereof, other versions are possible. Therefore, the spirit and scope of the appended claims should not be limited to the description of the preferred versions contained herein.

What is claimed is:

1. A low pressure seal for sealing a space defined by an inner diameter of a pipe and a rod slidably disposed within the pipe and extending beyond an end of the pipe, said low pressure seal comprising:

a one piece sealing insert, having an axial passage therethrough, said passage having an inner diameter sized for closely accommodating an outer diameter of a rod, and a longitudinal split cut at an angle extending from said axial passage to an outer surface of said sealing insert, said split oriented longitudinally on the axial passage and oriented at an angle from said axial passage on the outer surface, said sealing insert having a larger first end hub for sealing a space defined between a pipe and the rod, said sealing insert further having a middle neck portion, said neck portion for providing side load against an inner diameter of the pipe, said neck tapering to a second end, for providing easy entrance into the pipe, said insert for being forcibly received by the inner diameter of the pipe.

2. The low pressure seal of claim 1, wherein said one piece sealing insert is formed of a reusable, noncorrosive, shape retentive, resilient, boron-resistant, polymeric resin, which can resist at least 350 pounds per square inch of pressure.

3. The low pressure seal of claim 2, wherein said polymeric resin is a fluoro elastomer.

4. The low pressure seal of claim 1, wherein said middle neck portion of said sealing insert has a slanted edge, forming a conical shape, for providing additional compression against the inner diameter of the pipe when the insert is forcibly compressed into the pipe inner diameter.

5. The low pressure seal of claim 1, wherein said neck tapering to a second end for providing easy entrance into the pipe permits tool-free installation of said sealing insert.

6. A low pressure seal for providing a fluid seal in a guide annulus as defined by an inner diameter of a guide tube stub and a thimble tube slidably disposed within the guide tube stub, said low pressure seal comprising:

a one piece sealing insert, having an axial passage therethrough and a longitudinal split cut at an angle extending from said axial passage to an outer surface of said sealing insert, said split oriented longitudinally on the axial passage and oriented at an angle from said axial passage on the outer surface, said sealing insert having a larger first end hub for sealing a guide annulus, said sealing insert further having a middle neck portion for providing side load against the inner diameter of a guide tube stub, said neck tapering to a second end, for providing easy entrance into the guide tube stub, said sealing insert for being forcibly received by an inner diameter of the guide tube stub, the force provided by operator's hand for tool-free installation.

7. The low pressure seal of claim 6, wherein said one piece sealing insert is formed of a reusable, noncorrosive, shape retentive, resilient, boron-resistant, polymeric resin, able to resist at least 350 psi of pressure.

8. The low pressure seal of claim 7, wherein said polymeric resin is a fluoro elastomer.

9. The low pressure seal of claim 6, wherein said sealing insert has a slanted edge tapering from said neck to said second end, forming a conical shape, for providing additional compression against the inner diameter of the guide tube stub when the sealing insert is forcibly compressed into the guide tube annulus.

10. A low pressure seal, in combination with a conventional compression cap and compression nut retaining system, for providing a fluid seal in a guide annulus as defined by an inner diameter of a guide tube stub and a thimble tube slidably disposed within the guide tube stub, for use in a nuclear power plant pressurized water reactor, said low pressure seal comprising:

a washer-less one piece sealing insert, having an axial passage therethrough and a longitudinal split cut at an angle extending from said axial passage to an outer surface of said sealing insert, said split oriented longitudinally on the axial passage and oriented at an angle from said axial passage on the outer surface, said sealing insert having a larger first end hub for sealing a space defined between a guide tube stub and a thimble tube, said sealing insert further having a middle neck portion, said neck portion for providing side load against an inner diameter of the guide tube stub, said neck tapering to a second end for providing easy entrance into the guide tube stub, said sealing insert for being forcibly received by the inner diameter of the guide tube stub, the force provided by operator's hand for tool-free installation; and said sealing insert retained in position on the guide tube stub by a compression cap screw received by a compression nut positioned on the guide tube stub.

11. The low pressure seal of claim 10, wherein said one piece sealing insert is formed of a reusable, noncorrosive, shape retentive, resilient, boron-resistant, polymeric resin, able to resist at least 350 psi of pressure.

12. The low pressure seal of claim 11, wherein said polymeric resin is a fluoro elastomer.

13. The low pressure seal of claim 10, wherein said sealing insert has a slanted edge tapering from said neck to said second end, forming a conical shape, for providing compression pressure against the inner diameter of the guide tube stub when the sealing insert is forcibly compressed into the guide tube annulus.

14. A method for providing a low pressure fluid seal, for sealing a guide annulus as defined by an inner diameter of a pipe and a rod slidably disposed within the pipe, said method comprising:

providing a sealing insert having an axial passage longitudinally therethrough, said sealing insert having a larger first end hub, said sealing insert further having a middle neck portion tapering to a second end;

installing said sealing insert, said sealing insert having a longitudinal split oriented longitudinally on the axial passage and oriented at an angle from the axial passage on the outer surface, about the rod; and inserting said second end into said pipe, so that said middle neck portion provides side load against the inner diameter of the pipe and so that the hub seals a space defined between the pipe and the rod such that having said split formed at an angle impedes the fluid from penetrating the seal when the split is compressed within the annular space.

15. A method according to claim 14, wherein said longitudinal split is cut at an angle extending from said axial passage to an outer surface of said sealing insert, said split oriented longitudinally on the axial passage and said split oriented at an angle from the outer surface of said sealing insert covering over the annular space between an exterior diameter of the outer tube and exterior diameter of the inner tube for providing continuous pressure from the exterior diameter of the outer tube to the exterior diameter of the inner tube.

16. A method according to claim 14, wherein the guide annulus is defined by an inner diameter of a guide tube stub and a thimble tube slidably disposed with the guide tube stub, and wherein said seal provides a seal of the guide annulus in a nuclear power plant pressurized water reactor.

17. A method according to claim 14, and further comprising screwing a compression cap screw into a compression nut positioned on said guide tube stub, thereby holding the fluid seal in position.

* * * * *